United States Patent [19]

Tasma

[11] 4,356,656
[45] * Nov. 2, 1982

[54] FLYING INSECT KILLER AND LIGHT FIXTURE INCORPORATING SAME

[76] Inventor: Gerald W. Tasma, 3617 Colonial, NE., Grand Rapids, Mich. 49505

[*] Notice: The portion of the term of this patent subsequent to Feb. 24, 1981, has been disclaimed.

[21] Appl. No.: 215,715

[22] Filed: Dec. 12, 1980

Related U.S. Application Data

[63] Continuation of Ser. No. 958,430, Nov. 7, 1978, Pat. No. 4,251,945, which is a continuation-in-part of Ser. No. 854,360, Nov. 23, 1977, abandoned.

[51] Int. Cl.³ .............................................. A01M 1/04
[52] U.S. Cl. ...................................... 43/113; 43/132 R
[58] Field of Search ............... 30/276; 43/111, 113, 43/132 R, 137, 142; 362/362, 363, 367

[56] References Cited

U.S. PATENT DOCUMENTS

| | | | |
|---|---|---|---|
| 1,036,331 | 8/1912 | Plumer | 43/138 |
| 1,701,674 | 2/1929 | Hitosi | 43/111 |
| 2,737,753 | 3/1956 | Bittner | 43/113 |
| 2,789,208 | 4/1957 | Thatcher | 362/367 |
| 2,799,117 | 7/1957 | Stokes et al. | 43/113 |
| 3,041,773 | 7/1962 | Gagliano | 43/113 X |
| 3,047,829 | 7/1962 | Mouat | 362/363 X |
| 3,123,933 | 3/1964 | Roche | 43/113 X |
| 3,831,278 | 8/1974 | Voglesonger | 30/276 |
| 3,895,226 | 7/1975 | Murray | 362/367 |
| 4,251,945 | 2/1981 | Tasma | 43/113 |

*Primary Examiner*—Stephen G. Kunin
*Assistant Examiner*—Robert P. Olszewski
*Attorney, Agent, or Firm*—Varnum, Riddering, Wierengo & Christenson

[57] ABSTRACT

A light fixture incorporating a motorized insect exterminator includes a frame, a light source, and a motor mounted on the frame. A drive shaft of the motor is connected to an end of a clear and pliable plastic impeller. A translucent plate is mounted between the light source and plastic impeller. The free end of the impeller is rotated between 2,000 and 3,600 RPM's by the motor, sweeping out a circular area in the proximity of the plate on the opposite side from the light source. Flying insects, attracted to the light source, fly toward the light source, slow down to land on the plate, fly through the circular area at a relatively slow speed, and are fatally hit by the rapidly revolving impeller. The impeller is flexible enough and light enough to not injure or cut a finger which comes in contact with the rotating impeller.

17 Claims, 5 Drawing Figures

FLYING INSECT KILLER AND LIGHT FIXTURE INCORPORATING SAME

CROSS-REFERENCE TO RELATED APPLICATION

This application is a continuation of application Ser. No. 958,430 filed Nov. 7, 1978, now U.S. Pat. No. 4,251,945, which in turn is a continuation-in-part of Ser. No. 854,360 filed Nov. 23, 1977, now abandoned.

BACKGROUND OF THE INVENTION

1. Field of the Invention

This invention relates to an insect exterminator and more particularly to an outdoor light fixture incorporating a motorized insect exterminator which uses a pliable whipping element attached to a rapidly rotating motor drive shaft.

2. Description of the Prior Art

Man in his quest to rid himself and his immediate surroundings from annoying flying insects has used many techniques and methods. One method is to enclose his body in a screened enclosure. However, insects always manage to enter into his screened surroundings.

Man has also used chemicals which repel or kill insects. Some of these chemicals work with a great deal of effect. However, since the chemicals also pose a slight danger to man himself, the chemicals are not usually used near kitchens or other places where food is prepared or consumed.

Motorized insect killers, disclosed in U.S. Pat. Nos. 1,816,396 issued to Oppenlander on July 28, 1931; 2,737,753 issued to Bittner on Mar. 13, 1966; 2,778,150 issued to Pohlman on Jan. 22, 1957; 2,799,117 issued to Stokes III et al on July 16, 1957; and 3,123,933 issued to Roche on Mar. 10, 1064, have a light which attracts flying insects and a rapidly rotating rod or blade which is located in the vicinity of the light source. Insects are attracted to the light source, and are killed when they encounter the blade or rod.

The problem encountered with the above-motorized insect killers is that the rapidly rotating blade or element can injure a person's, particularly a child's fingers or limbs. The light which attracts the insects may also attract small children who occasionally may stick their fingers through the rotating blade. To minimize the danger, a shield or screen would be required about the rotating blades. A protective shield is disclosed in the Roche, Pohlman and Stockes III, et al references. However, a shield which prevents the entrance of limbs or fingers into the blades also discourages or inhibits the insect's passage therethrough to the light source to be killed by the whirling blade. Consequently, the efficiency of the safer insect killers is decreased.

SUMMARY OF THE INVENTION

According to the invention, a safe, yet effective, motorized insect killer is free from the deficiencies and limitations of a protective shield with the use of a pliable plastic filament rotating at a substantial speed. The insect killer comprises a lure for attracting flying insects thereto and a motor with a rotatable shaft in the proximity of the lure. At least one lightweight, nonmetallic, pliable filament is attached at a portion thereof to the rotatable shaft. The filament is freely pliable in that it bends of its own weight when held at one end. The motor rotates the filament generally at sufficient speeds such that the string sweeps a circular area fast enough to hit insects flying therethrough. The filament generally rotates between 1,000 and 8,000 RPM's. Preferably, the motor should rotate less than 4,800 RPM's because at higher speeds the filament starts to produce a noise which would repel insects from entering through the circular shaped area. Preferably, the speeds should be maintained above 2,000 RPM's so the probability of fatally hitting a passing insect with the whirling filament remains high.

The filament has a specific gravity less than 2.0, preferably less than 1.0, and is rotated at such speed to have the ability to kill the insects if it hits the insect, but, on the otherhand, to be safe if a finger is accidentally placed in the area of the circle wherein the finger will be free from cuts or injury. The low inertia of the filament due to the lightweight nature of the material in combination with the flexibility of the filament produces no bruises or cuts on the finger which comes in contact with the filament.

Preferably, the filament is transparent so that when it rotates quickly, there is less of an illusion that there is a wall or barrier at the disc which would tend to inhibit insects from flying therethrough.

Preferably, the filament is made from a nylon, or other synthetic polymer such as polyethylene, polypropylene, elastomer or leather or such other pliable plastic material. The filament preferably has a diameter between 0.05 and 0.10 inches (1.27–2.54 mm).

The relationship between the specific gravities of the filament material and the diameter of the filament is inversely related to the speed at which the motor rotates the string. At low RPM's, the string must have sufficient momentum to kill the insect upon impact. In order to do this at the lower speeds around 2,000 RPM's, the weight of the string must be heavier or the specific gravity shall approach 2.0. If a lighter material is used, the diameter of the string should be increased to about 0.10 inches (2.54 mm).

If a faster motor is used, the speed of the filament will provide more momentum to effectively kill the insects. Less mass is needed to do the job effectively. Because of the increased speed, lighter materials such as plastics with specific gravities of aroung 1 or even less than 1 can be used. The filament, when it is used with a motor which rotates at approximately 4,000 RPM's, should be made of a lightweight material and have a diameter of not less than 0.05 inches such that the filament will not cut or injure a finger if it is accidentally placed in contact with the rapidly rotating filament. The diameter of the filament assures that the force of contact is diffused over a sufficiently large area of skin so the force is not concentrated all at one point of the skin to produce a cut therein.

Preferably, the lure is a light source. Different kinds of lights can be used. Incandescent light is suitable. The frame is shaped to be attractive as a light fixture. In the daytime, a fragrance which attracts flying insects can be used in lieu of the light source.

Further according to the invention, a landing sight is mounted between a flexible filament and light source. The landing sight allows light from the light source therethrough. Preferably, the filament sweeps out a circular area from 0.068 inches to 1 inch from the landing sight. A distance of 0.13 or 0.125 inches is suitable. The landing sight can be a translucent plate or a transparent plate with visible markings thereon.

In another embodiment, a light source is mounted above an open-top basket. The motor is mounted to the basket. The filament revolves in a horizontal plane below the top edge of a basket so that the insects are retained within the basket when flung from the filament.

In operation, the light source or fragrance is activated which attracts insects thereto. The motor is turned on to rapidly whirl the filament string to sweep about a circular area. Insects see the light through the rapidly rotating string, fly toward the light, and fatally encounter the whirling filament as they pass through the circular area. The filament, by being pliable, hits the insect and wraps about it in whip-like fashion to more efficiently kill the insects.

In the embodiment which employs the landing sight, the insects attracted by the light source fly toward it and slow down to avert or land on the landing sight. However, when the insects slow down, they pass the circular area. The filament fatally hits the insects. The landing sight increases the probability of the insects being hit by the filament since the insects fly more slowly through the circular area.

DETAILED DESCRIPTION OF THE PREFERRED EMBODIMENT

Figure 1:
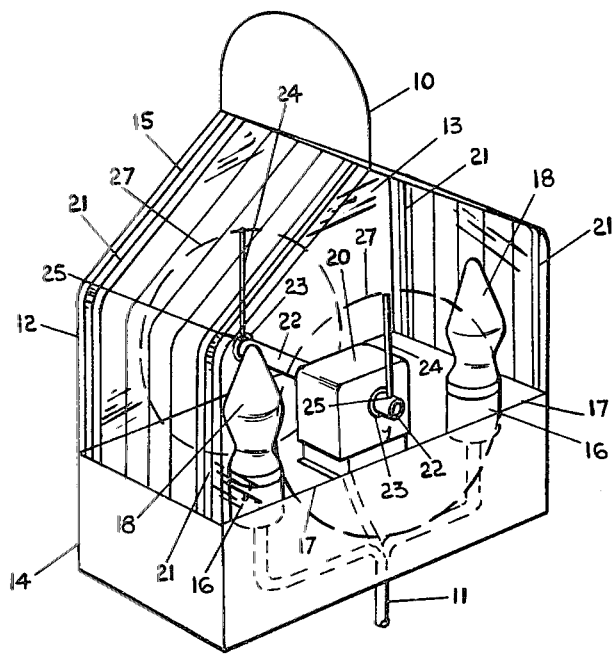
FIG. 1 is a perspective view of one embodiment of the invention.

Referring particularly to FIG. 1, a suspended hanger 10 supports a frame 12 which can be attractively formed of wrought iron or aluminum. The frame has two open ends 13 and 15. The bottom portion of the frame forms a tray 14. Two light sockets 16 are mounted within the tray 14. Two incandescent light bulbs 18 are operably connected to the socket 16. A motor 20 is also operably mounted within tray 14. A power cord 11 operably connects the motor and light socket to a power source. The motor 20 has a drive shaft 22 outwardly extending from opposite sides of the motor 20. The drive shaft 22 extends between the two light bulbs 18. A flexible filament 24 has one end 25 tied or otherwise connected to the drive shaft 22. A second identical filament 24 is similarly connected to the other end of the drive shaft 22.

Each filament is made from a clear plastic material. The plastic is pliable and flexible. The plastic has a specific gravity of approximately 1. The diameter of the filament is between 0.05 and 0.10 inches (1.27 to 2.54 mm). A fish line with a test strength of about fifty pounds, commonly used for fishing, is a suitable filament. Other filaments ade from nylon, and other polymers such as polyethylene, polypropylene, polyvinyl chloride, or leather would also be suitable.

Two translucent plates 21 are mounted within openings 13 and 15 and between light sources 18 and filaments 24. Each plate 21 has an aperture 23 therethrough through which each end of drive shaft 22 extends. The plate has visible markings 33 simulating the side bars of frame 12. The drive shaft rapidly rotates so that the filament sweeps out a vertical circular area 27 defining a plane between and parallel to the planes defined by open ends 13 and 15 and approximately 0.125 inches spaced from the plates 21. The circular area is positioned vertically over the tray 14 and below the top edge 17 of the tray 14. The filament 24 whirls about free from interference with any portion of the tray, frame, light sockets, bulbs, plates or the motor itself.

In operation, the lights 18 and motor 20 are turned on and the filament sweeps out the circular-shaped area 27 at a speed of about 3,600 RPM's. Insects are attracted through openings 15 and 13 to the light bulbs 18. As the insect approaches the translucent plate, it slows down to land on the plate. As the insect slows down, the insect will cross the circular area 27 and be fatally hit by the rapidly rotating filament 24. The filament 24 is more effective when the whirling filament is positioned near the translucent plate because the insect slows down as it flies directly through the circular-shaped area 27 so statistically, the chances are greater the filament will hit the insect than if the insect quickly flew through the circular-shaped area.

The drive shaft rotates between 2,000 and 4,000 RPM's. When the filament hits the insects, the flexibility of the filament creates a whip-like effect about the insect body. The dead insect will fall into the tray 14.

If a finger is accidentally inserted toward the light while the motor is whirling the filament, the filament will hit but not hurt the finger or cut the finger in any way. The filament is a soft and pliable line with a low enough specific gravity to merely be stopped and deflected by the finger and straightening out again when it is rotated free from the finger, only to be deflected again by the finger in the next rotation to the finger. When the finger is removed from the circular area, the filament straightens out and immediately returns to its normal pattern.

Figure 2:
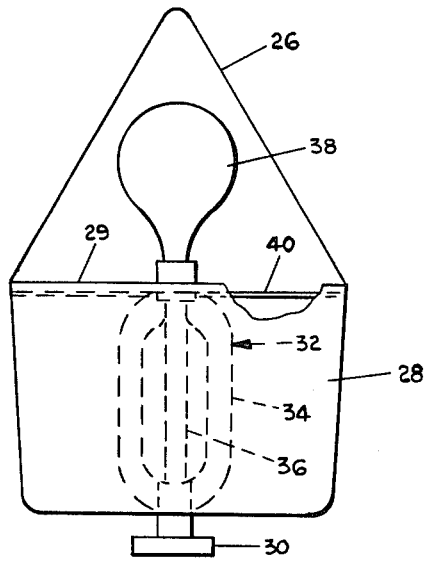
FIG. 2 is a partially-broken side elevational view of a second embodiment of the invention.

FIG. 2 shows a second embodiment of the invention in which the filament rotates within a horizontally defined plane. A hanger 26 suspends a basket 28. A female electric socket 30 is mounted to the bottom of the basket and is operably connected through the body of the basket to a vertically mounted electric motor 32. The electric motor 32 comprises a rotor 34 and a stator 36. A light bulb 38 is mounted atop stator 36 and is operably connected to the female plug 30.

A filament 40 has the same properties as the filament in the first embodiment described above.

When the motor is actuated, the motor 32 rotates the filament about a horizontal plane below the light bulb 38 and the top edge 29 of basket 28. The insects attracted to the light bulb fly down below the light bulb and are killed by the rotating filament 40. The basket captures the insects flying outwardly by the whirling filament and retains the bodies of the dead insects.

Figure 3:
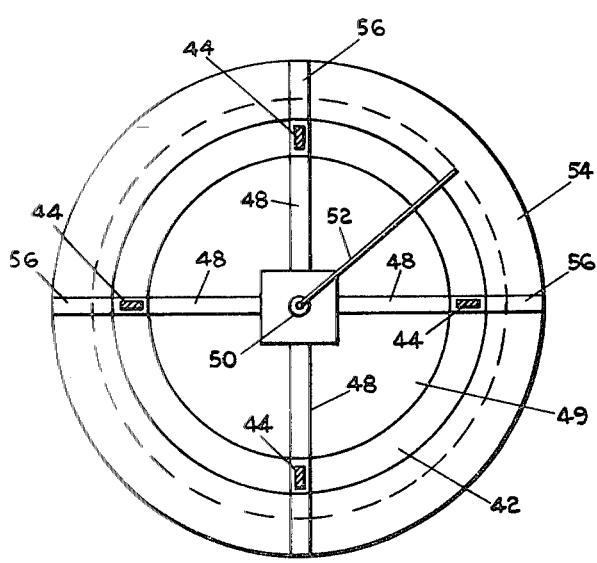
FIG. 3 is a plan view of the third embodiment of the invention.

FIG. 3 shows a third embodiment of the invention which uses a fluorescent tube 42 as a lure. The tube 42 is mounted by structural supports 44 to a wall or ceiling. A motor 46 is centrally mounted by supports 48 in the central area 49 of the tube 42. The motor has drive shaft 50 extending upwardly from the light tube 42. Mounted below the light tube 42 is a basket 54 mounted by supports 56.

Filament 52 has the same properties as the filament in the first two embodiments described above. The basket 54 catches the bodies of the dead insects hit by the whirling filament 52.

Figure 4:
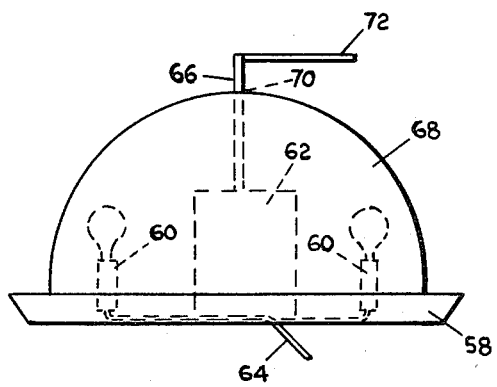
FIG. 4 is a side elevational view of a fourth embodiment of the invention.

A fourth embodiment is disclosed in FIG. 4. The fourth embodiment has a tray 58. Mounted within the tray 58 are the light sources 60 and the motor 62. The power cord 64 extends downwardly from the tray and is operably connected to the light sources 60 and motor 2. The motor has a drive shaft extending vertically upwardly. A translucent dome 68 is placed within the tray 58 and covers the light sources 60 and motor 62. The translucent qualities of the dome 68 diffuses the light from the light source to illuminate the dome 68. An output shaft 66 of motor 62 extends outwardly through a central hole 70 in the dome 68.

A filament 72, having the same properties as the filament in the first three embodiments, is attached to the shaft 66 and rapidly rotates in a horizontal plane above the dome. The flying insects are attracted by the illuminated dome 68 and fly around the dome, slow down to land thereon, and are fatally hit by the whirling filament 72 in the same fashion as described in the first embodiment.

Figure 5:
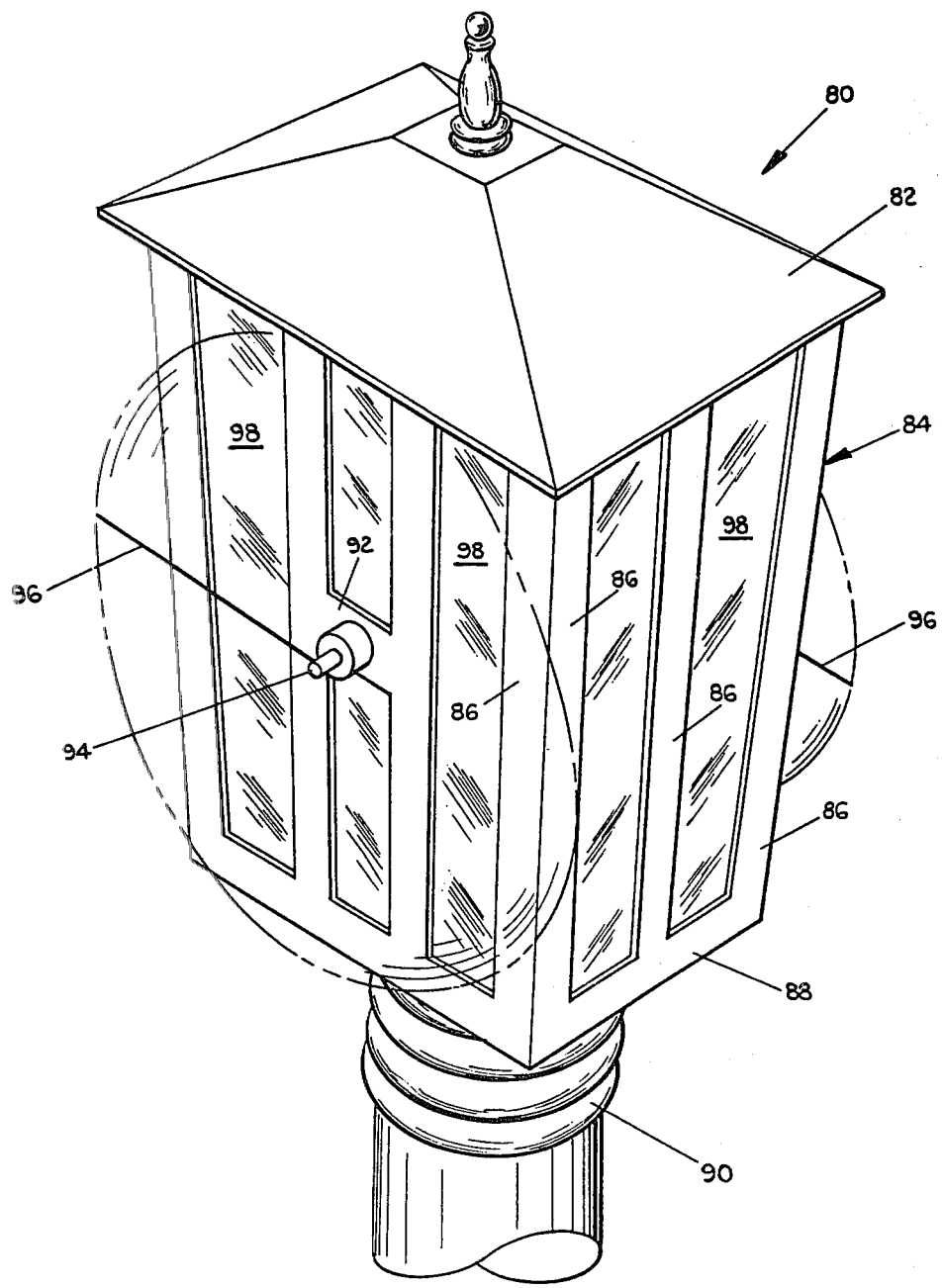
FIG. 5 is a perspective view of a fifth embodiment of the invention.

Referring now to FIG. 5, there is illustrated a fifth embodiment of the invention. In this embodiment, a housing 80 has a rectangular top 82, a bottom (not shown), and four side walls 84 which are formed of a plurality of spaced vertical opaque strips 86 of metal or plastic with bottom strips 88 of metal or plastic. A base support 90 provides support for the housing 80. The base support can be a post. A cross-member 92 is provided in one of the side walls and an output shaft 94 from a motor (not shown) is journaled in the cross-member 92. A filament 96 of identical construction to the filaments 24, 40, 52 and 72 disclosed in the first through fourth embodiments, is secured to the output shaft 92 for rotation in a plane parallel to, but spaced from, the housing side wall 84. A motor and filament are provided in the opposite side of the housing as well so that the filaments 96 rotate in parallel planes on opposite sides of the housing. Transparent or translucent windows 98 are provided between the spaced strips 86 to allow light to pass therethrough. A light source, such as a conventional light bulb (not shown), is mounted within the housing in the same fashion as shown in embodiments 1 through 4 in order to illuminate the area surrounding the housing 80.

The light from the light source within the housing 80 is transmitted through the windows 98 to attract insects. To this end, the light source can be any conventional light source in the visible or invisible spectrum. However, the visible light spectrum is preferred because the device can then function as a lighting fixture. Th opaque strips are wide enough, for example 1 inch (2.54 cm) so that they are discreetly visible to the insects. This device of FIG. 5 produces an alternating pattern of light and dark patterns to the insect.

The embodiment described in FIG. 5 provides a series of spaced opaque landing sites for insects. It has been found that insects, while being attracted to light, do not fly directly into the light source. Rather, they are attracted to the light and attempt to land near to the light. Accordingly, the opaque strips provide attractive landing sites for the insects. Thus, as the insects fly toward the light and toward the vertical strips 86, they pass through the plane of the rotating filament 96 slowing down to land on the strips 86. If they succeed in making it through the plane the first time, it is very unlikely that they will make it through the plane of the rotating strips when they attempt to fly from the landing site to other landing sites around the light. Preferably, the filament 96 rotates approximately 1/32 to 1/16" (0.794 mm to 1.585 mm) above the vertical strips 86. Under these circumstances, it would be virtually impossible for an insect of normal size to pass through the plane of the rotating filament 96.

The invention has been found to be quite successful in attracting and killing flying insects. When using identical light sources, it has been found to be as effective as the conventional electrostatic bug killers. Yet the device is attractive, functions as a light source, and is much quieter than the electrostatic type of bug killers.

In all embodiments, the filament 72 is spun between 2,000 and 4,000 RPM's preferably between 3,000 and 3,600 RPM's. In this fashion, an effective motorized insect killer has a whirling filament spinning about in an open area, and fatally hitting and whipping insects. A landing sight is used to statistically increase the chance that the filament will hit the insect by slowing down the insect's flight through the area swept by the filament. The whirling filament is safe and does not injure and cut fingers or other body appendages when accidentally inserted into the whirling filament. Because of the lightweight and flexible nature of the filament, a safety screen is unneeded and the insect killer avoids the limitations and inefficiencies of a safety screen covering the whirling filament.

In this fashion, an attractive light fixture can be safely used outdoors without the nuisance of many insects attracted by the light emitting therefrom to spoil the outdoor surroundings. The light fixture doubles as an effective insect killer so the insects attracted by the light from the fixture are killed and the immediate surroundings remain insect free.

Reasonable variation and modifcations are possible within the scope of the foregoing disclosure and drawing without departing from the spirit of the invention which is defined by the appended claims.

The embodiments of the invention in which an exclusive property or privilege is claimed are defined as follows:

1. An insect killer comprising:
   a lure medium for attracting flying insects thereto;
   a motor with a rotatable shaft;
   mounting means for mounting the motor near the lure medium;
   at least one lightweight, nonmetallic, freely pliable filament attached at a portion thereof to the rotatable shaft, the filament having a specific gravity less than 2.0;
   the motor having means to rotate the filament at a speed of 2,000 to 4,000 RPM so that the filament sweeps about a circular area fast enough to be statistically effective in hitting insects flying therethrough, so that wind turbulence is minimized and so that safety for humans is maintained; and
   whereby the filament has the ability to kill by impact the insects it hits while rotating at such speeds but is safe from cutting or injuring a limb or finger placed in the circular area swept by the rotating filament.

2. An insect killer as defined in claim 1 wherein the filament is made from a pliable plastic and has a specific gravity of approximately 1.0.

3. An insect killer as defined in claim 1 wherein the filament is made of clear, pliable plastic.

4. An insect killer as defined in claim 1 wherein the diameter of the filament is between 0.05 and 0.10 inches (1.27 to 2.54 mm.).

5. An insect killer as defined in claim 4 wherein the filament is a fish line of approximately fifty pound strength and the motor rotates the filament between 3,000 and 3,600 RPM's.

6. An insect killer as defined in claim 5 wherein the filament is made of a clear, pliable plastic and is free from shielding on a side obverse to the lure medium.

7. An insect killer as defined in claim 1 wherein the lure is a light source and the mounting means includes a light fixture frame for mounting the light source thereon and allowing light to emit therefrom, and further, wherein the filament is free from shielding on a side obverse to the lure medium.

8. An insect killer as defined in claim 7 further comprising a translucent dome fitting over the light source and motor, the drive shaft extends through an opening in the dome, and the filament is attached to the shaft outside of the dome.

9. An insect killer as defined in claim 1 wherein the filament is a fish line of approximately fifty pound strength and the motor rotates the filament at a speed between 3,000 and 3,600 RPM's.

10. An insect killer according to claim 9 wherein the filament is free from shielding on a side of a circular area swept by filament obverse from the lure medium.

11. An insect killer as defined in claim 1 wherein the mounting means includes a frame supporting the lure and the motor;
the frame having a bottom tray portion and upper portion with two open ends through which insects may enter;
the filament rotates in a plane parallel and between the two planes defined by the open ends; and
the filament is positioned between the two open ends such that insects attracted to the lure from one end pass through the area swept by the rotating filament.

12. An insect killer as defined in claim 11 and further comprising a landing site mounted to the frame between the lure and the filament, the landing site is spaced from the area swept by the filament such that insects attracted to the lure slow down to land on the landing site and pass through the swept area at a relatively slow flying speed to statistically increase the probability that the filament hits the insects.

13. An insect killer as defined in claim 11 wherein the filament is a clear, flexible plastic with a diameter between 0.05 and 0.10 inches (1.27 to 2.54 mm.).

14. An insect killer as defined in claim 1 wherein the mounting means includes:
a basket supporting the motor and lure;
the basket has an open top;
the lure is a light source;
the light source is positioned above the open top; and
the motor is positioned below the open top of the basket and rotates the filament within a horizontal plane below the light source and within the basket below a top edge of the basket.

15. An insect killer as defined in claim 1 wherein the mounting means includes a frame comprising a plurality of spaced opaque strips of material between the lure medium and the filament to provide landing sites for the insects, the lure medium being sensible to the insects through the spaces between the opaque strips of material.

16. An insect killer according to claim 15 wherein the lure medium is a light source and further comprising translucent or transparent panels between the opaque strips.

17. An insect killer as defined in claim 15 wherein the filament is a clear, flexible plastic with a diameter between 0.05 and 0.10 inches (1.27–2.54 mm.).

* * * * *